INVENTOR.
Murray C. Young
BY
Popp and Sommer
ATTORNEYS

June 27, 1967  M. C. YOUNG  3,328,728
APPARATUS FOR MONITORING THE FUNDAMENTAL MODE OF AN
ELECTROMAGNETIC WAVE TRAVELING IN AN
OVERSIZE WAVEGUIDE
Filed Feb. 23, 1965  2 Sheets-Sheet 2

INVENTOR.
Murry C. Young
BY
Popp and Sommer
ATTORNEYS

3,328,728
APPARATUS FOR MONITORING THE FUNDAMENTAL MODE OF AN ELECTROMAGNETIC WAVE TRAVELING IN AN OVERSIZE WAVEGUIDE
Murray C. Young, Williamsville, N.Y., assignor to Cornell Aeronautical Laboratory, Inc., Buffalo, N.Y., a corporation of New York
Filed Feb. 23, 1965, Ser. No. 434,377
6 Claims. (Cl. 333—10)

This invention relates to electromagnetic wave apparatus.

The primary object of the present invention is to provide apparatus for enabling the monitoring or measuring of the power or intensity of the fundamental mode of an electromagnetic wave traveling in a waveguide so dimensioned that higher order modes such as the $TE_{20}$ and $TE_{01}$ modes can propagate in the waveguide, as well as the fundamental mode $TE_{10}$. Such a waveguide is sometimes referred to by those skilled in the art as an oversize waveguide to distinguish it from a standard or regular waveguide which is so dimensioned that only the fundamental mode $TE_{10}$ can propagate therein.

The power level that can be transmitted through a standard waveguide is limited by the dimensions of the waveguide. When the transmission of higher power levels is required, an oversize waveguide must be used. However undesired higher order modes can propagate in an oversize waveguide along with the desired fundamental mode. Any device used to monitor or measure the power or intensity of the fundamental mode may transfer power from the fundamental mode to the higher modes unless it is carefully designed so as to prevent this transfer.

The present invention is concerned with means for monitoring or measuring the power or intensity of just the fundamental mode without exciting the higher modes.

Other objects and advantages of the present invention will be apparent from the following description of a preferred embodiment illustrated in the accompanying drawings in which:

FIG. 2 is a perspective view of such fundamental mode coupler as viewed in cross-section and illustrating the same diagrammatically with the aforesaid measuring means.

FIG. 3 is a sectional view of the inventive fundamental mode coupler and taken on line 3—3 of FIG. 2.

FIG. 4 is another sectional view thereof taken on line 4—4 of FIG. 2.

FIG. 5 is still another sectional view thereof taken on line 5—5 of FIG. 2.

Figure 1:
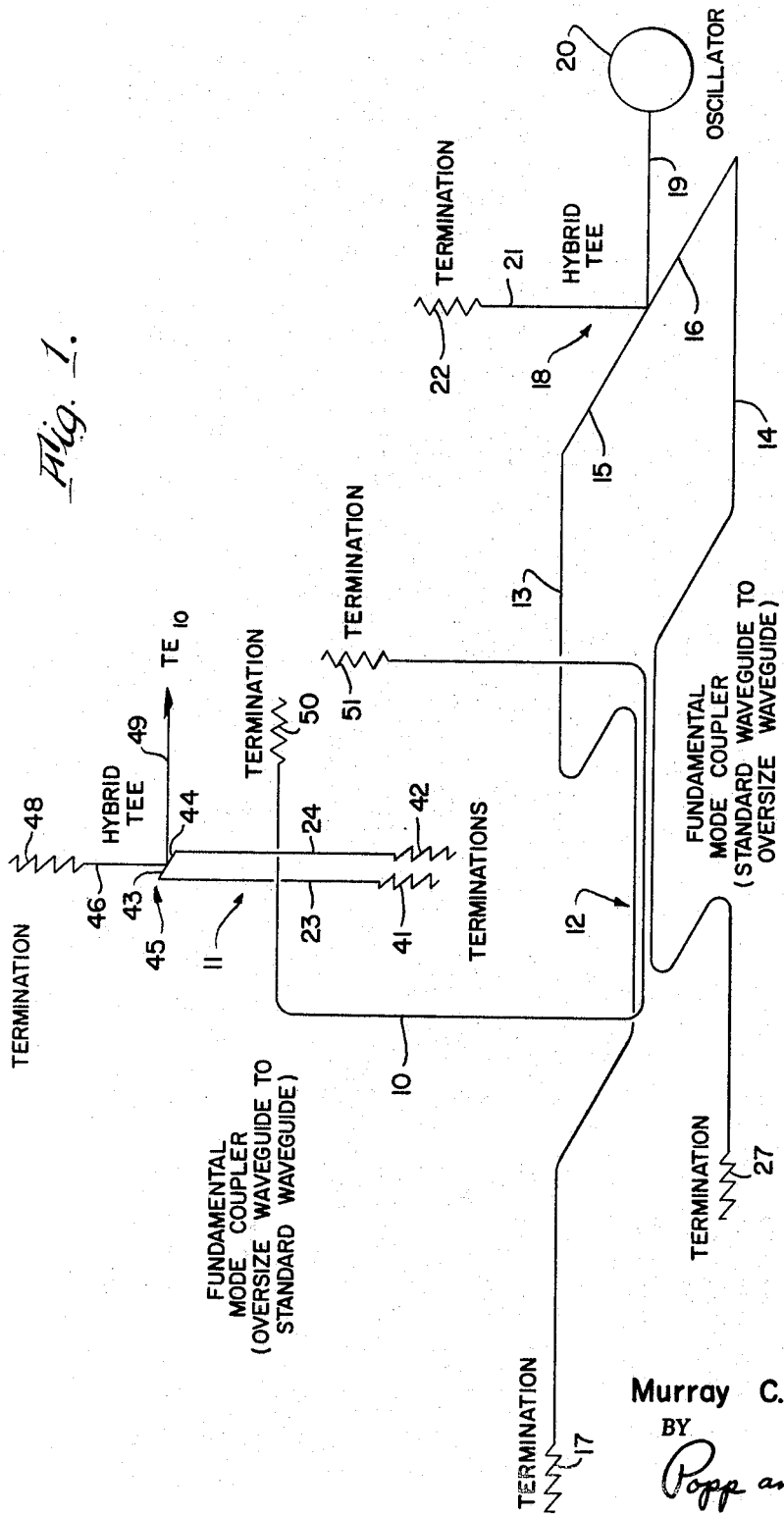
FIG. 1 is a perspective schematic view of waveguide apparatus including a fundamental mode coupler embodying the principles of the present invention and illustrating such coupler associated with means for measuring the intensity of the fundamental mode coupled out.

The numeral 10 represents an oversize waveguide, i.e. one so dimensioned that the fundamental mode and higher modes of an electromagnetic wave can propagate therein. The numeral 11 represents generally the apparatus wherein the present invention resides for coupling out and monitoring just the fundamental mode of an electromagnetic wave traveling through the oversize waveguide 10.

The means for propagating an electromagnetic wave through waveguide 10 forms no part of the present invention and may be of any suitable construction. Purely for illustrative purposes, the means for accomplishing this is shown as including a fundamental mode coupler indicated generally at 12 which comprises a pair of standard waveguides 13 and 14 arranged on opposite sides of a portion of oversize waveguide 10 and communicating therewith interiorly by coupling holes (not shown) in a manner known to those skilled in the art. The corresponding ends of waveguides 13 and 14 are shown as connected to the parallel or side arms or ports 15 and 16, respectively, of a hybrid tee or magic tee indicated generally at 18. This hybrid tee 18 also includes a third H-arm or port 19 which is shown as associated with a suitable oscillator or magnetron 20. A fourth or E-arm 21 of the hybrid tee is shown as connected to a suitable termination 22. The opposite ends of the waveguides 13 and 14 are shown as terminating in suitable terminations 17 and 27, respectively.

Referring to FIG. 2, the fundamental mode coupler 11 comprises a pair of waveguides 23 and 24 arranged on opposite sides of wageguide 10. Each of waveguides 10, 23 and 24 is rectangular in cross-section. Central waveguide 10 includes a pair of opposite broad sides 25 and 26 and a pair of opposite narrow sides 28 and 29. Outer waveguide 23 includes a pair of opposite broad sides 30 and 31 and a pair of opposite narrow sides 32 and 33. The other outer waveguide also includes a pair of opposite broad sides 34 and 35 and a pair of opposite narrow sides 36 and 37.

In FIG. 2, broadsides 25 and 26 are shown arranged generally horizontally while the remaining sides of all waveguides are shown arranged vertically. Sides 28 and 31 for the width of side 28 provide a common wall. Similarly sides 29 and 34 for the width of side 29 provide a common wall.

Outer waveguides 23 and 24 are shown as being similarly dimensioned in cross-section but smaller proportionately than intermediate waveguide 10 and arranged asymmetrically on opposite sides thereof, specifically perpendicular thereto and directly opposite each other.

Common wall 28, 31 is provided with at least one coupling hole 39. Common wall 29, 34 also is provided with at least one coupling hole 40. As shown these holes are circular, of the same diameter and directly opposite each other. As also shown a second pair of opposite coupling holes 39' and 40' is provided in these common walls and longitudinally spaced and laterally offset from the corresponding holes 39 and 40. These holes are also shown as being circular and of the same diameter. All of holes 39, 39', 40 and 40' extend through the corresponding common wall to connect the interiors of the corresponding waveguides. Thus holes 39 and 39' connect the interiors of waveguides 10 and 23, whereas holes 40 and 40' connect the interiors of waveguides 10 and 24.

The holes in each pair, such as 39, 40 or 39', 40', must be opposite each other and similarly shaped, sized and located. As shown, all of holes 39, 39', 40 and 40' are of the same diameter; holes 39 and 40 are arranged adjacent broad side 26 of central waveguide 10; and holes 39' and 40' are arranged adjacent broad side 25 of this waveguide.

Outer waveguides 23 and 24 at one corresponding end are shown as connected severally to suitable terminations 41 and 42, respectively. At their opposite ends these waveguides 23 and 24 are shown as connected to the parallel input or side arms or ports 43 and 44, respectively, of a hybrid tee or magic tee indicated generally at 45. This hybrid tee 45 also includes a third or H-arm or port 46 which is shown as associated with a suitable termination 48. An output or E-arm or port 49 completes the hybrid tee 45. Arms or ports 43, 44 and 46 are shown as arranged in one plane and arm or port 49 is arranged in a plane perpendicular thereto.

Suitable terminations 50 and 51 are shown as connected to the opposite ends of oversize waveguide 10.

The oscillator 20 in combination with hybrid tee 18 provide means for propagating electromagnetic waves of equal amplitude and phase through the two outer waveguides 13 and 14 of the fundamental mode coupler 12. Through this coupler 12 substantially only the fundamental mode $TE_{10}$ is excited in central waveguide 10 although dimensionally it is large enough so that higher modes such as the $TE_{20}$ and $TE_{01}$ modes can possibly propagate therein.

The coupler 45 provides a means for monitoring the power or intensity in the fundamental mode $TE_{10}$ of an electromagnetic wave traveling through oversize waveguide 10. This coupler will sample the fundamental mode $TE_{10}$ without exciting the higher order modes $TE_{20}$ and $TE_{01}$. If the higher order modes as well as the fundamental mode propagate in waveguide 10, the fundamental mode is independently monitored by the coupler 11 in conjunction with the hybrid tee 45.

The function of the directional coupler 11 is to couple from the $TE_{10}$ mode in oversize waveguide 10 to the $TE_{10}$ mode in standard waveguides 23 and 24. The coupler must not excite higher modes $TE_{20}$ and $TE_{01}$ in oversize waveguide 10. This is accomplished by coupling holes 39, 39', 40 and 40' in both narrow walls of waveguide 10 which holes in the pair 39, 40 and pair 39', 40' are directly opposite each other. The higher mode fields excited by one set of coupling holes are opposite in phase to those generated by the set in the opposite wall and the two fields therefore cancel.

Referring to FIG. 3, the horizontal spacing center to center between holes 40 and 40' in a direction longitudinally of central waveguide 10 is one quarter of the wavelength in waveguide 10 and is represented by $\lambda g_1/4$ where $\lambda g_1$ is the wavelength in waveguide 10 (also designated $g_1$). The vertical spacing center to center between holes 40 and 40' in a direction longitudinally of outer waveguide 24 or perpendicular to the longitudinal extent of central waveguide 10 is one quarter of the wavelength in waveguide 24 and is represented by $\lambda g_2/4$ where $\lambda g_2$ is the wavelength in waveguide 24 (also designated $g_2$).

The offset placement of the holes 39, 39', 40 and 40' allows the output waveguides 23 and 24 to be placed perpendicular to input waveguide 10, this minimizing the length of the coupler 11 measured in a direction extending longitudinally of waveguide 10. Instead of this perpendicular arrangement of the waveguides, output waveguides 23 and 24 may extend longitudinally of input waveguide 10 with the narrow side 29 and broad side 34 and the other narrow side 28 and broad side 31 still providing common walls in which the coupling holes in each such wall such as holes 40 and 40' will now be placed centrally of the corresponding common wall measured between broad sides 25 and 26 and be spaced from center to center longitudinally of input waveguide a distance still represented by $\lambda g_1/4$.

By way of example, for a frequency of 2850 megacycles and using a WR430 waveguide for input waveguide 10 and a WR284 waveguide for each of output waveguides 23 and 24, the quarter guide wavelength in WR430 is 1.512 inches, the quarter guide wavelength in WR284 is 1.180 inches, and the diameter of each of coupling holes 39, 39', 40 and 40' is 0.412 inch.

If the two higher modes $TE_{20}$ and $TE_{01}$ are present in input waveguide 10, they can be eliminated from the coupler 11 by feeding the two outputs to the parallel arms 43 and 44 of the hybrid tee 45, as shown. The sum of the outputs produced by the fundamental $TE_{10}$ mode will appear at output arm or port 49 of the hybrid tee 45 while the outputs due to the higher modes $TE_{20}$ and $TE_{01}$ will not. This separation of the fundamental $TE_{10}$ mode from these higher modes is possible because the fundamental mode in input waveguide 10 excites in phase fundamental $TE_{10}$ modes in the two output waveguides 23 and 24, while the $TE_{20}$ and $TE_{01}$ modes excite opposite phase modes in these two output waveguides.

Variations may occur to those skilled in the art and hence the embodiment shown is illustrative and not limitative of the present invention which is to be measured by the scope of the appended claims.

What is claimed is:
1. A fundamental mode coupler comprising a first waveguide rectangular in cross-section including a pair of opposite narrow sides and so dimensioned that the fundamental mode and higher modes of an electromagnetic wave can propagate therein, a second waveguide rectangular in cross-section having a broad side providing a common wall with one of said narrow sides, and a third waveguide rectangular in cross-section having a broad side providing a common wall with the other of said narrow sides, said second and third waveguides being similarly dimensioned in cross-section but smaller than said first waveguide and symmetrically arranged on opposite sides of said first waveguide, each of said common walls having a coupling hole therethrough connecting the interiors of the corresponding waveguides, such holes being opposite each other and similarly shaped, sized and located.

2. A fundamental mode directional coupler comprising a first elongated waveguide rectangular in cross-section including a pair of opposite narrow sides and so dimensioned that modes higher than the fundamental mode of an electromagnetic wave can propagate therein, a second waveguide rectangular in cross-section having a broad side providing a common wall with one of said narrow sides, and a third waveguide rectangular in cross-section having a broad side providing a common wall with the other of said narrow sides, said second and third waveguides being similarly dimensioned in cross-section but smaller than said first waveguide and symmetrically arranged on opposite sides of said first waveguide, said common walls having two pairs of coupling holes extending therethrough to connect the interiors of the corresponding waveguides, said pairs being spaced from each other longitudinally of said first waveguide, said holes in each of said pairs being opposite each other and similarly shaped, sized and located.

3. A fundamental mode directional coupler comprising a first elongated waveguide rectangular in cross-section including a pair of opposite narrow sides and so dimensioned that modes higher than the fundamental mode of an electromagnetic wave can propagate therein, a second waveguide rectangular in cross-section having a broad side providing a common wall with one of said narrow sides, and a third waveguide rectangular in cross-section having a broad side providing a common wall with the other of said narrow sides, said second and third waveguides being similarly dimensioned in cross-section but smaller than said first waveguide and arranged perpendicular to said first waveguide and on opposite sides thereof and directly opposite each other, said common walls having two pairs of coupling holes extending therethrough to connect the interiors of the corresponding waveguides, said pairs being spaced from each other laterally and longitudinally of said first waveguide, said holes in each of said pairs being opposite each other and similarly shaped, sized and located.

4. In apparatus including a first waveguide rectangular in cross-section having a pair of opposite narrow side walls and so dimensioned that the fundamental mode and higher modes of an electromagnetic wave can propagate therein, the combination therewith of means for measuring the intensity of said fundamental mode, comprising a hybrid tee having two parallel input ports and an output port, and second and third waveguides severally on said narrow walls and connected to said input ports and each being rectangular in cross-section having a broad side providing a common wall with the corresponding one of said narrow walls, such common walls having coupling holes directly opposite each other and connecting the interiors of the corresponding waveguides, whereby the higher modes coupled out through said holes in one of said common walls are opposite in phase to and cancel out the higher modes coupled out through said holes in the other of said common walls whereas the fundamental mode coupled out through said holes appears at said output port.

5. In apparatus including a first elongated waveguide rectangular in cross-section having a pair of opposite narrow side walls and so dimensioned that the fundamental mode and higher modes of an electromagnetic wave can propagate therein, the combination therewith of means for measuring the intensity of said fundamental mode, comprising a hybrid tee having two parallel input ports and an output port, and second and third waveguides severally on said narrow walls and connected to said input ports and each being rectangular in cross-section having a broad side providing a common wall with the corresponding one of said narrow walls, said second and third waveguides being similarly dimensioned in cross-section but smaller than said first waveguide and arranged perpendicular to said first waveguide and directly opposite each other, such common walls having two pairs of coupling holes extending therethrough to connect the interiors of the corresponding waveguides, the holes in one of said pairs being directly opposite each other and similarly shaped, sized and located, the holes in the other of said pairs being directly opposite each other and similarly shaped, sized and located and spaced from said one of said pairs longitudinally of said first waveguide and laterally of said one of said pairs on the side thereof closer to said input ports, whereby the higher modes coupled out through said holes in one of said common walls are opposite in phase and cancel out the higher modes coupled out through said holes in the other of said common walls whereas the fundamental mode coupled out through said holes appears at said output port.

6. In apparatus including a first elongated waveguide rectangular in cross-section having a pair of opposite narrow side walls and so dimensioned that the fundamental mode and higher modes of an electromagnetic wave can propagate therein, the combination therewith of means for measuring the intensity of said fundamental mode, comprising a hybrid tee having two parallel input ports and an output port, and second and third waveguides severally on said narrow walls and connected to said input ports and each being rectangular in cross-section having a broad side providing a common wall with the corresponding one of said narrow walls, said second and third waveguides being similarly dimensioned in cross-section but smaller than said first waveguide and arranged perpendicular to said first waveguide and directly opposite each other, such common walls having two pairs of coupling holes extending therethrough to connect the interiors of the corresponding waveguides, the holes in one of said pairs being directly opposite each other and similarly shaped, sized and located, the holes in the other of said pairs being directly opposite each other and similarly shaped, sized and located and spaced from said one of said pairs longitudinally of said first waveguide and laterally of said one of said pairs on the side thereof closer to said input ports, such longitudinal spacing center to center of the holes in each of said pairs being the quarter guide wavelength in said first waveguide, such lateral spacing center to center of the holes in each of said pairs being the quarter guide wavelength in said second and third waveguides, whereby the higher modes coupled out through said holes in one of said common walls are opposite in phase and cancel out the higher modes coupled out through said holes in the other of said common walls whereas the fundamental mode coupled out through said holes appears at said output port.

References Cited
UNITED STATES PATENTS 3,078,423 2/1963 Lewis _____ 333—10 X
3,112,460 11/1963 Miller _____ 333—10 X HERMAN KARL SAALBACH, *Primary Examiner.*

M. NUSSBAUM, *Assistant Examiner.*